United States Patent
Lassoued et al.

(10) Patent No.: US 11,593,873 B2
(45) Date of Patent: Feb. 28, 2023

(54) METHODS AND SYSTEMS FOR ESTABLISHING TRUST IN COMMERCE NEGOTIATIONS

(71) Applicant: INTERNATIONAL BUSINESS MACHINES CORPORATION, Armonk, NY (US)

(72) Inventors: Yassine Lassoued, Dublin (IE); Julien Monteil, Dublin (IE); Emanuele Ragnoli, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 449 days.

(21) Appl. No.: 16/552,923

(22) Filed: Aug. 27, 2019

(65) Prior Publication Data
US 2021/0065288 A1 Mar. 4, 2021

(51) Int. Cl.
| | | |
|---|---|---|
| G06Q 30/00 | (2012.01) | |
| G06Q 30/08 | (2012.01) | |
| G06F 16/2457 | (2019.01) | |
| H04L 9/06 | (2006.01) | |
| G06Q 30/0601 | (2023.01) | |
| H04L 9/00 | (2022.01) | |

(52) U.S. Cl.
CPC ....... *G06Q 30/08* (2013.01); *G06F 16/24578* (2019.01); *G06Q 30/0609* (2013.01); *H04L 9/0643* (2013.01); *H04L 9/50* (2022.05)

(58) Field of Classification Search
CPC . G06Q 30/08; G06F 16/24578; H04L 9/0643; H04L 2209/38
See application file for complete search history.

(56) References Cited

U.S. PATENT DOCUMENTS

| | | | |
|---|---|---|---|
| 9,928,290 B2 | 3/2018 | Tiell | |
| 2012/0054109 A1 | 3/2012 | Selsby | |
| 2013/0242340 A1* | 9/2013 | Liu | G06Q 30/02 358/1.15 |
| 2015/0242601 A1* | 8/2015 | Griffiths | H04L 63/0861 726/5 |
| 2017/0235766 A1* | 8/2017 | Mawji | G06F 16/9035 707/722 |
| 2017/0270527 A1 | 9/2017 | Rampton | |
| 2018/0049043 A1* | 2/2018 | Hoffberg | G06Q 10/0635 |
| 2020/0034925 A1* | 1/2020 | Dziuk | G06Q 40/025 |
| 2021/0154587 A1* | 5/2021 | Kaethler | A63F 13/798 |

FOREIGN PATENT DOCUMENTS

CN 108256965 A 7/2018

OTHER PUBLICATIONS

Roy, Atanu, et al. "Trustingness & trustworthiness: A pair of complementary trust measures in a social network." 2016 IEEE/ACM International Conference on Advances in Social Networks Analysis and Mining (ASONAM). IEEE, 2016.*

* cited by examiner

*Primary Examiner* — Kathleen Palavecino
(74) *Attorney, Agent, or Firm* — Griffiths & Seaton PLLC

(57) ABSTRACT

Embodiments for establishing trust in commerce negotiations are provided. Information associated with negotiation actions of each of a plurality of entities is stored in a shared ledger. A trustworthiness score is calculated for at least one of the plurality of entities based on the information associated with the negotiation actions of the at least one of the plurality of entities. The calculated trustworthiness score is provided to at least one other of the plurality of entities.

18 Claims, 6 Drawing Sheets

METHODS AND SYSTEMS FOR ESTABLISHING TRUST IN COMMERCE NEGOTIATIONS

BACKGROUND OF THE INVENTION

Field of the Invention

The present invention relates in general to computing systems, and more particularly, to various embodiments for establishing trust in commerce negotiations.

Description of the Related Art

In recent years, it has become increasingly common for various types of commerce to be negotiated (e.g., submitting/accepting offers, performing transactions, etc.) through online channels (e.g., "e-commerce," via the Internet, etc.). As such, various websites and mediation (or negotiation) systems are now available which allow, for example, buyers and sellers to interact (e.g., negotiate) through a computing system or software application (e.g., a mediator or mediated negotiation architecture). For example, the mediator may act on behalf of one of more of the parties (or entities), such as a buyer, to negotiate the best offers or transactions for them, while sellers may compete with each other to sell their products or services by making offers and counteroffers intended to attract the buyers while maximizing profitability. Such systems are often relatively efficient when a limited number of trusted entities are involved.

However, as the number of entities increases, it may become difficult to ascertain when the entities are acting in an "honest" or "bone fide" manner, as opposed to, for example, "bluffing" or "faking" offers to influence the negotiation process, uncover negotiation strategy of other entities, influence competitors to make suboptimal deals, etc.

SUMMARY OF THE INVENTION

Various embodiments for establishing trust in commerce negotiations, by a processor, are provided. Information associated with negotiation actions of each of a plurality of entities is stored in a shared ledger. A trustworthiness score is calculated for at least one of the plurality of entities based on the information associated with the negotiation actions of the at least one of the plurality of entities. The calculated trustworthiness score is provided to at least one other of the plurality of entities.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
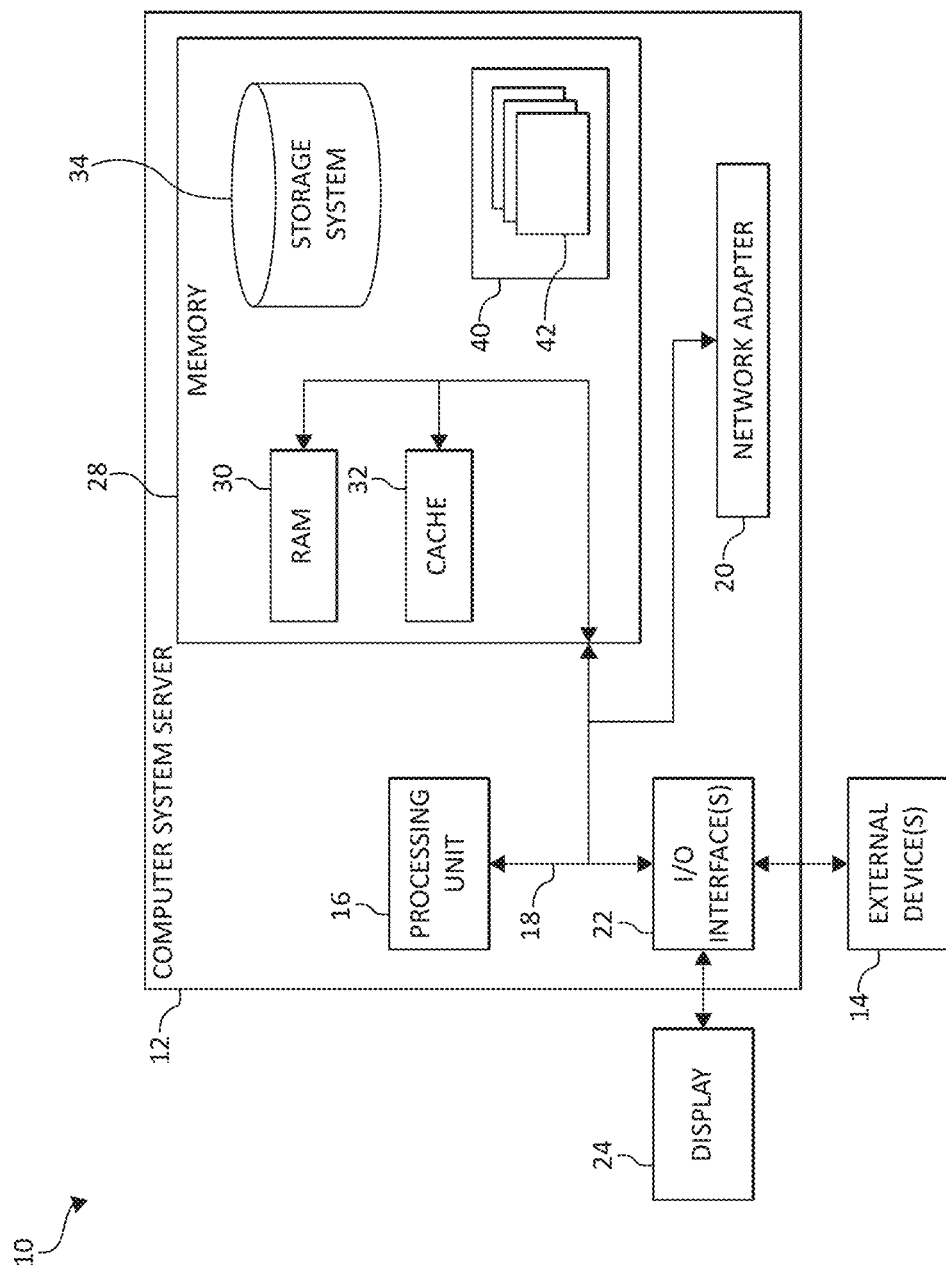
FIG. 1 is a block diagram depicting an exemplary computing node according to an embodiment of the present invention.

As discussed above, in recent years, it has become increasingly common for various types of commerce to be negotiated (e.g., submitting/accepting offers, performing transactions, etc.) through online channels (e.g., "e-commerce," via the Internet, etc.). As such, various websites and mediation (or negotiation) systems are now available which allow, for example, buyers and sellers to interact (e.g., negotiate) through a computing system or software application (e.g., a mediator or mediated negotiation architecture). For example, the mediator may act on behalf of one of more of the parties (or entities), such as a buyer, to negotiate the best offers or transactions for them, while sellers may compete with each other to sell their products or services by making offers and counteroffers intended to attract the buyers while maximizing profitability. Such systems are often relatively efficient when a limited number of trusted entities are involved.

However, as the number of entities increases, it may become difficult to ascertain when the entities are acting in an "honest" or "bone fide" manner, as opposed to, for example, "bluffing" or "faking" offers to influence the negotiation process, uncover negotiation strategy of other entities, influence competitors to make suboptimal deals, etc.

To address these needs and/or the shortcomings in the prior art, in some embodiments described herein, methods and/or systems are disclosed that facilitate in establishing "trust" between entities (or parties) involved in commerce (e.g., e-commerce) negotiations and/or otherwise facilitate performing the resulting transactions.

In some embodiments, information related to the (previous) negotiations and/or transactions of the entities involved, such as offers, counteroffers, and subsequent actions/transactions (e.g., purchases, cancellations, returns, etc.), is utilized as input. This information is registered with or stored in a shared ledger and utilized to calculate a "trustworthiness score" for each (or at least some) of the entities. The calculated scores may then be utilized in or by the negotiation (or offer) strategies (or negotiation offer strategies) of the entities.

The shared ledger may be, for example, a blockchain or a distributed database system with a quorum type of consensus. The information associated with the negotiations (or negotiation actions) of the entities may include, for example, each offer or counteroffer made by any negotiating party in the context of a given negotiation, links between counteroffers and the respective previous offers, whether an offer was accepted or rejected, whether a promise was fulfilled by a negotiating party, whether or not a transaction was performed (e.g., purchased made or cancelled), etc.

The trustworthiness scores may be calculated based on, for example, one or more (e.g., a combination) of the number of times a party concluded an offer, the number of times a party fulfilled or did not fulfill its promise to sell/buy a product/service at an agreed price, the number of times a party (or entity) cancelled the negotiation, the number of times a party's final offer was not accepted by the adversary, etc. (i.e., "trustworthiness criteria"). A party may decide not to make an offer or counteroffer if the negotiating parties involved are not trustworthy enough (or based on the calculated score(s)). For example, if a seller is known to not fulfill its promises (e.g., after agreeing to a negotiated price), an adversary seller may decide not to provide a counteroffer. A party may decide the attributes of an offer or counteroffer depending on the trustworthiness of the parties involved in the negotiation (or based on the calculated score(s)).

More specifically, in some embodiments, a shared (or distributed) ledger (e.g., a blockchain or a distributed database system with a quorum-based consensus) is utilized to store information (or data) associated with (previous) negotiation actions of (at least some of) the entities involved in a negotiation. The shared ledger may be accessible by and/or provided to each of the involved entities, and the information associated with negotiation actions may include, for example, (previous) offers, counteroffers, whether or not offers were accepted or rejected, the performance of transactions following offers, other trustworthiness criteria, and/or any other such information described herein. In other words, the shared ledger may store (or keep track of) information pertaining to the trustworthiness (or honest/bone fide behavior or lack thereof) of the parties, such as whether the parties are actually fulfilling their promises (or agreements) to buy/sell a given product (or service) at the agreed price and under the agreed conditions.

This information may be utilized to define a measure (e.g., trustworthiness) and/or calculate (or determine) a trustworthiness score for at least some of the entities (or negotiation parties). The calculating of the trustworthiness score may include determining a vector (or trustworthiness score vector) for each (or at least some) of the entities. The trustworthiness score calculated for each entity may then be utilized by the entities (e.g., the other entities) and/or incorporated into the negotiation strategies of the entities. For example, the other entities may utilize the scores to determine their next step in the negotiation process (e.g., accept/reject an offer, make a counteroffer, ignore an offer, etc.), perhaps after receiving information associated with the other entity's current negotiation actions (e.g., offers, etc. received during the current/most recent negotiation process).

The methods and systems described herein may utilize existing, well-established technologies, such as blockchain, thus reducing implementation efforts. Additionally, while optimizing the benefits of the methods/systems described herein may ideally require the negotiating parties to adapt their negotiation models/strategies by taking into account trustworthiness measures (or scores), such may not necessarily or exclusively require sophisticated adjustments. Rather, simple adaptations, such as thresholds related to the calculated trustworthiness scores, may be utilized, further facilitating the ease of implementation.

It should be understood that at least some of the aspects of functionality described herein (e.g., calculating trustworthiness scores) may be performed utilizing a cognitive analysis. The processes described herein may utilize various information or data sources associated with users (e.g., entities) and/or the content of communications (e.g., offers, etc.). With respect to users (or entities), the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, calculate trustworthiness scores of users (or entities), perhaps in combination with the information stored in the shared ledger(s).

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, establishing trust in commerce negotiations, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for establishing trust in commerce negotiations, by a processor, is provided. Information associated with negotiation actions of each of a plurality of entities is stored in a shared ledger. A trustworthiness score is calculated for at least one of the plurality of entities based on the information associated with the negotiation actions of the at least one of the plurality of entities. The calculated trustworthiness score is provided to at least one other of the plurality of entities.

The information associated with the negotiation actions of each of the plurality of entities may include at least one of offers, acceptance of offers, and transaction performance (i.e., trustworthiness criteria). The shared ledger may include at least one of a blockchain and a distributed database system with a quorum-based consensus.

The calculating of the trustworthiness score for the at least one of the plurality of entities may include determining a trustworthiness score vector for the at least one of the plurality of entities. The determining of the trustworthiness score vector for the at least one of the plurality of entities may include determining a vector component for each of a plurality of trustworthiness criteria within the information associated with the negotiation actions of the at least one of the plurality of entities. The calculating of the trustworthiness score for the at least one of the plurality of entities may include calculating a trustworthiness score for each of the plurality of entities.

The calculated trustworthiness score may be caused to be utilized in an offer decision strategy of the at least one other of the plurality of entities. The information associated with negotiation actions of each of a plurality of entities may include information associated with previous negotiation actions of each of the plurality of entities. Information associated with current negotiation actions of each of the plurality of entities may be received.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
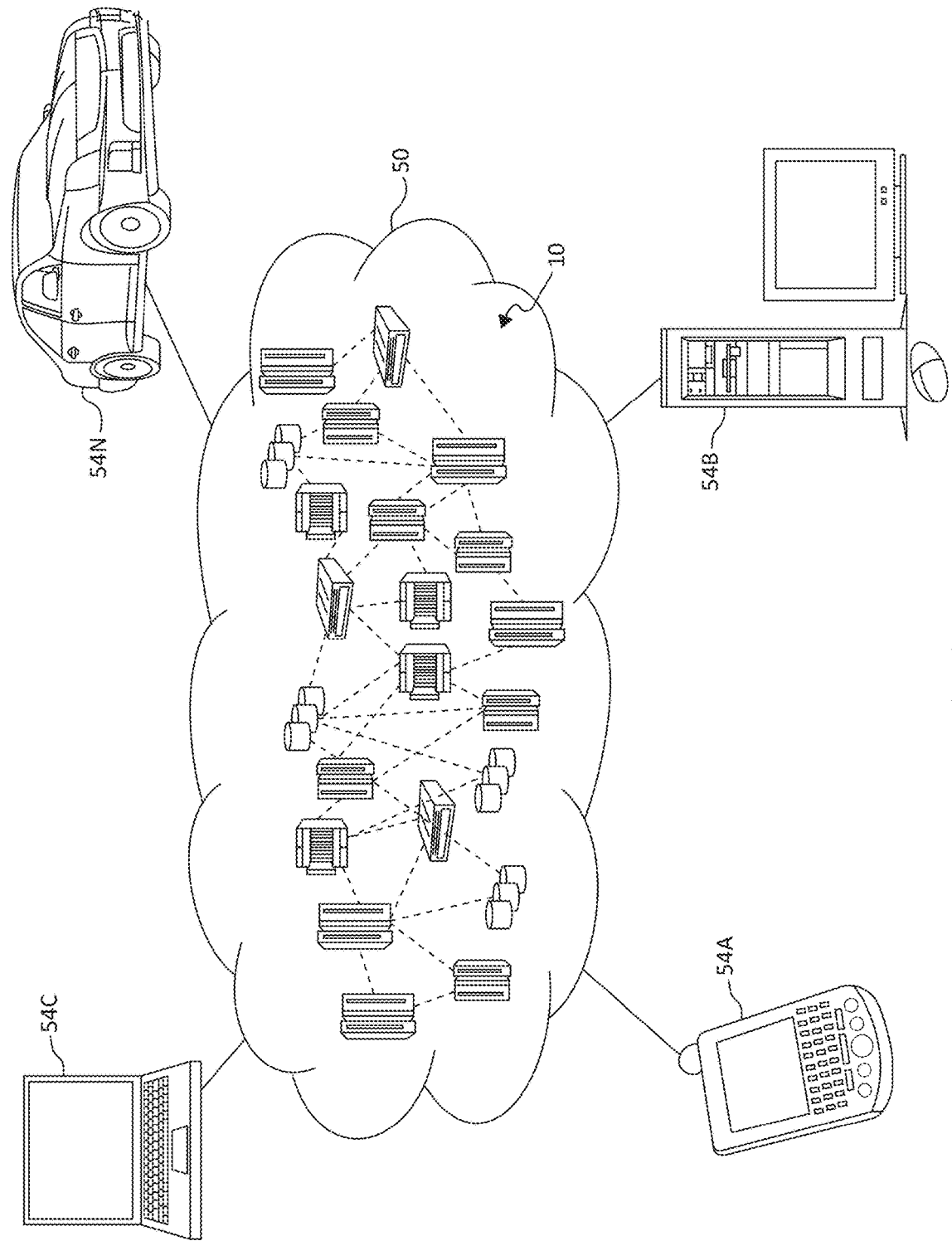
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
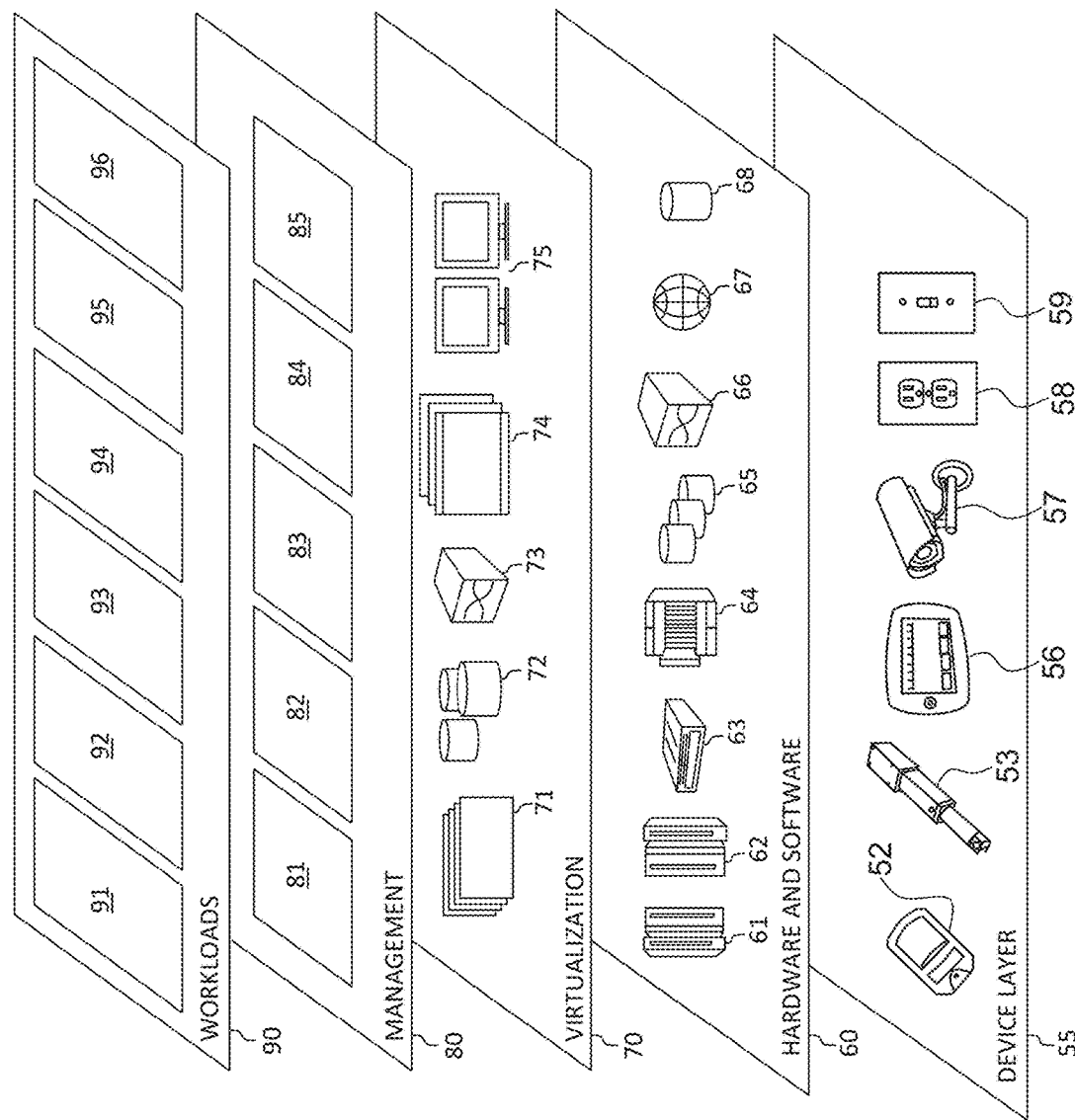
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for establishing trust in commerce negotiations, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for establishing trust in commerce negotiations are provided. In some embodiments, a shared (or distributed) ledger (e.g., a blockchain or a distributed database system with a quorum-based consensus) is utilized to store information (or data) associated with (previous) negotiation actions of (at least some of) the entities involved in a negotiation. The shared ledger may be accessible by and/or provided to each of the involved entities, and the information associated with negotiation actions may include (previous), for example, offers, counteroffers, whether or not offers were accepted or rejected, the performance of transactions following offers, and/or any other such information described herein. In other words, the shared ledger may store (or keep track of) information pertaining to the trustworthiness (or honest/bone fide behavior or lack thereof) of the parties, such as whether the parties are actually fulfilling their promises (or agreements) to buy/sell a given product (or service) at the agreed price and under the agreed conditions.

This information (and/or the trustworthiness criteria included therein) may be utilized to define a measure (e.g., trustworthiness) and/or calculate (or determine) a trustworthiness score (or trust worthiness score vector) for at least some of the entities. The trustworthiness score calculated for each entity may then be utilized by the other entities and/or incorporated into the negotiation (or offer decision) strategies of the entities (e.g., the other entities). For example, the other entities may utilize the scores to determine their next step in the negotiation process (e.g., accept/reject an offer, make a counteroffer, ignore an offer, etc.), perhaps after receiving information associated with the other entity's current negotiation actions (e.g., offers, etc. received during the current/most recent negotiation process).

Figure 4:
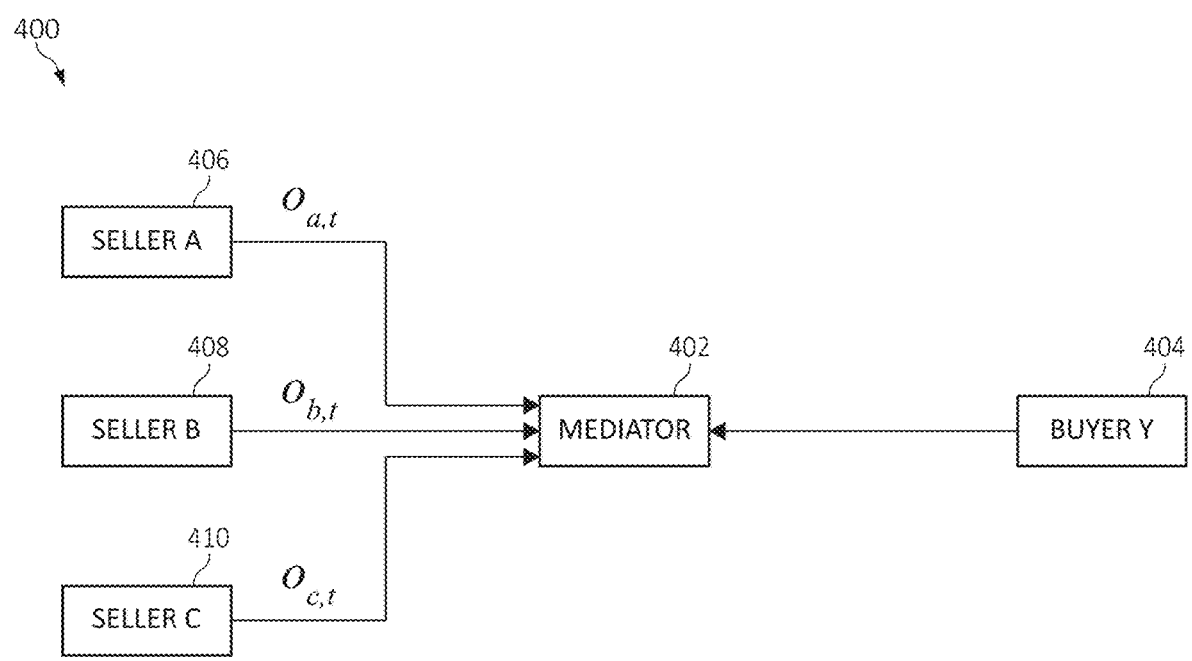
FIG. 4 is a block diagram of an exemplary mediated negotiation environment in which the methods and systems described herein may be utilized according to an embodiment of the present invention.

FIG. 4 illustrates an exemplary negotiation (and/or computing) environment (e.g., a mediated negotiation environment) 400 in which the methods and systems described herein may be implemented. In the example shown, the environment 400 includes a mediator (or mediator agent) 402, a buyer (or buyer agent) 404 (or Buyer Y), and seller (or seller agents) 406, 408, and 410 (or Seller A, Seller B, and Seller C), each of which may correspond to an entity involved in a negotiation and/or a computing node utilized during a negotiation.

In particular, the mediator 402 may be (or include) a mediation (or negotiation) system and/or a computing node configured to perform such functionality, including at least some aspects of functionality described herein. The mediator 402, the buyer 404, and sellers 406-410 may be (or include) the entities (or parties) involved in the negotiation and/or computing nodes utilized by the entities. Such computing nodes may be in the form (or include) any suitable computing device, such as those described above (e.g., a desktop PC, a mobile electronic device, etc.), and/or software application and be configured to perform the various functionalities described herein (e.g., generating/sending negotiation actions, receiving/analyzing shared ledgers, calculating trustworthiness scores, cognitive analysis, etc.). Additionally, at least some of the computing nodes may be integrated into common computing devices and/or located locally. However, in some embodiments, the nodes may be remote from each other and in operable communication via any suitable communication network (e.g., the Internet).

With respect to the example shown in FIG. 4, consider a scenario in which the mediator 402 is acting on behalf of the buyer 404 to negotiate the best offer/transaction for that entity (although in other embodiments, the mediator may be acting on behalf of one or more of the sellers 406-410, both the buyer 404 and the sellers 406-410, etc.). In such a scenario, an offer (o) for a given product (or service) may be characterized by a set of attributes (e.g., price, quantity, warranty period, delivery time, etc.) and their respective values. Such may be assimilated into a tuple of attribute values as $o=(o_1, o_2, \ldots, o_n)$.

The buyer 404 may request (e.g., via the mediator 402) offers (e.g., "best" offers) for the product from the sellers 406-410. The "best" offer, according to the buyer 404, may be defined as the optimum (e.g., maximum) offer for a utility function, which may be expressed as $f(o)=f(o_1, o_2, \ldots, o_n)$. The sellers 406-410 may also be attempting to optimize their offers from their perspectives while remaining as attractive as possible to the buyer 404. For example, each of the sellers 406-410 (denoted x) may have an objective function to optimize, which may be expressed as $g_x(o)=g_x(o_1, o_2, \ldots, o_n)$, which typically conflicts with the buyer's 404 utility function (f) and/or the buyer's 404 intentions/best interest.

During the negotiation, at a first time (t), the mediator 402 may receive an offer $o_{x,t}$ from each of the sellers 406-410. More specifically, at time (t), the mediator may receive offer $o_{a,t}$ from seller 406 (or Seller A), offer $o_{b,t}$ from seller 408 (or Seller B), and offer $o_{c,t}$ from seller 410 (or Seller C). As an example, it should be assumed that the offer from seller 406 is more "interesting" to (or "better" for) the buyer 404 than the offer from seller 408, which in turn is more interesting than (or at least as interesting as) the offer from seller 410. In other words, at time (t), $f(o_{a,t}) > f(o_{b,t}) \geq f(o_{c,t})$.

The mediator 402 may then inform seller 408 and seller 410 of the offer from seller 406 (or "challenge" seller 408 and seller 410 with the offer from seller 406), intending/attempting to receive better offers (or counteroffers) from them. For example, at a second or later time (t+1), seller 408 may submit a different offer (or counteroffer). The counteroffer may be a function of the previous offer from seller 408 and the offer of the competitor (e.g., seller 406), which may be expressed as $o_{b,t+1}=h_b(o_{b,t}, o_{a,t}, \ldots)$. The counteroffer may be an attempt to beat their previous offer and/or that of the competitor. However, a situation in which the counteroffer (or second offer) is the same as the previous offer ($o_{b,t}$) and/or the seller (e.g., seller 408) does not submit another offer (e.g., perhaps indicating that the seller does not want to continue with negotiations) may be considered. The negotiation may proceed in such a manner until, for example, the buyer 404 is satisfied (and/or accepts an offer), the negotiation is cancelled, a deadline is reached, etc.

In such a scenario, it may be difficult for the entities involved (including the mediator 402) to ascertain whether or not the other entities are behaving in an honest or bone fide manner. For example, when the mediator challenges seller 408 with the offer from seller 406, in an attempt to receive a better counteroffer, it may be difficult for seller 408 to ascertain whether or not the mediator 402 is "bluffing." Additionally, even if the mediator 402 is trustworthy, it may be difficult for seller 408 to ascertain whether or not seller 406 is (also) trustworthy. That is, seller 408 may be concerned that seller 406 is merely attempting to lure other sellers to sell their products (or services) at suboptimal prices. Furthermore, it may be difficult for the sellers 406-410 to ascertain whether or not the buyer 404 is a "serious" customer legitimately considering buying their products, as opposed to a malicious entity (e.g., a "bot") trying to uncover the negotiation strategies of the other entities.

As such, in some embodiments, a shared (or distributed) ledger (e.g., a blockchain) is introduced and/or utilized, on which information associated with the negotiation actions (e.g., previous negotiation actions and/or current negotiation actions) of the entities (e.g., the buyer 404, sellers 406-410, and perhaps the mediator 402) is stored or registered. For example, the shared ledger may include each offer or counteroffer made by any of the entities in the context of negotiations, whether offers were accepted or rejected, whether promises/agreements were fulfilled, purchases made or cancelled, etc. (or trustworthiness criteria).

Based on such information, a trustworthiness measure is introduced or assigned to each (or at least some) of the entities. For example, a trustworthiness score may calculated or determined for each of the entities based on the information within the ledger. The trustworthiness score may be calculated as a scalar or a vector (i.e., a trustworthiness score vector(s)). The trustworthiness score(s) (or vector(s)) may be calculated based on, for example, trustworthiness criteria, such as the number of times an entity fulfilled its promise/agreement to sell/buy a product/service at an accepted offer, the number of times an entity did not fulfill its promise, the number of times an entity cancelled a negotiation, the number of times an entity's final offer was not accepted by another entity, etc. The calculated trustworthiness score(s) of each entity may then be provided to the other entities (e.g., via generating a signal representative thereof, causing the scores to be rendered on a rendering device, such as a display screen, etc.) and utilized by the other entities as arguments/components within their negotiation (or offer) strategies (e.g., to further negotiations, accept offers, etc.).

Figure 5:
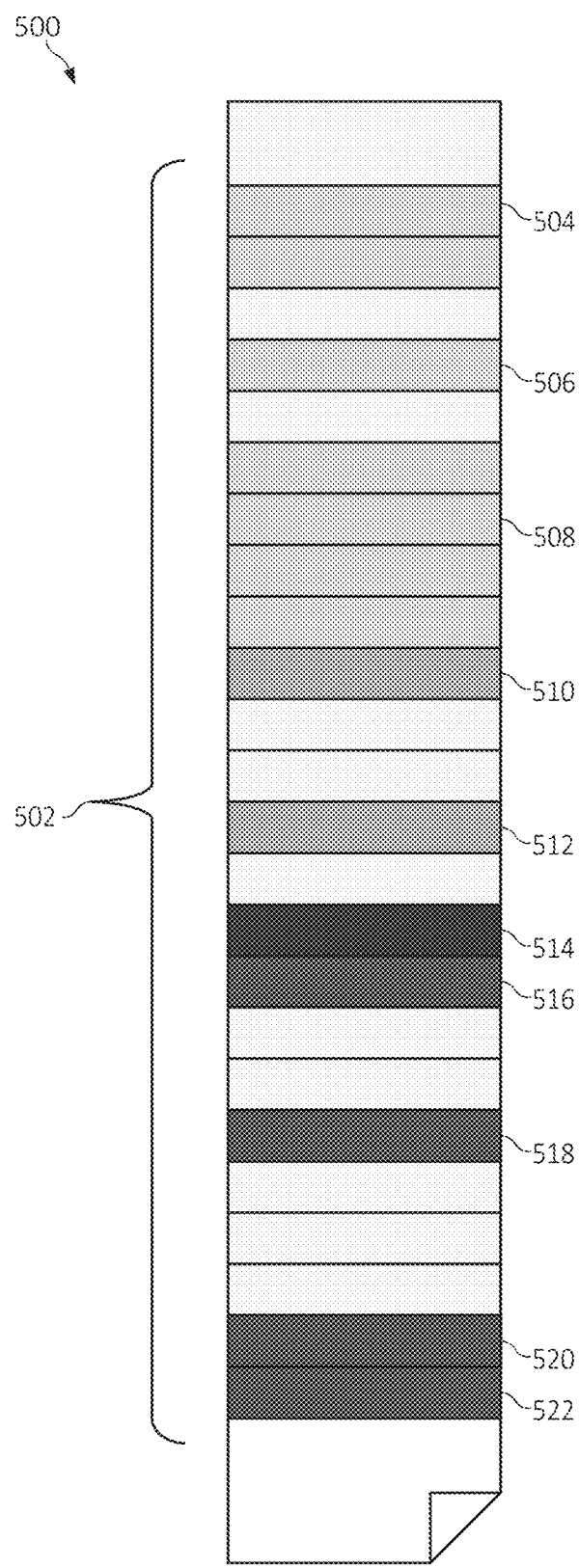
FIG. 5 is a simplified view of a shared ledger according to an embodiment of the present invention.

FIG. 5 is a simplified illustration of an exemplary shared (or distributed) ledger 500 according to an embodiment of the present invention. The shared ledger 500 may be, for example, a blockchain or a distributed database system with a quorum type of consensus. The shared ledger 500 includes information associated with the previous negotiation actions in the form of records 502 of (or associated with) one or more entities (e.g., buyers, sellers, mediators, etc.). The information in each of the records 502 may include, for example, an identity (or identification) of the associated entity (e.g., name, identification number, etc.) along with descriptive information related to a particular negotiation action, such as those described above.

It should be understood that the storing of the information on/in the shared ledger 500 (and/or the formation of the shared ledger 500) may be included in the processes described herein. However, in some embodiments, the shared ledger 500 may be previously created/maintained and received/retrieved and utilized by the present embodiments as described herein (e.g., to calculate trustworthiness scores for entities).

In the example shown, it should be assumed that records 504-522 (i.e., particular ones of the records 502) are associated with a particular entity or party (x) (e.g., a Seller A in FIG. 4). In some embodiments, the trustworthiness score vector may be determined (or calculated) or expressed as $s^x=(s_1^x, \ldots, s_k^x)$. For example, records 504, 506, and 508 may indicate occurrences in which the seller promised (or agreed) to sell a product (P) at a particular price, under particular conditions. Records 510 and 512 may indicate occurrences in which offers from the seller were not accepted by a buyer (e.g., the buyer received better offers from other sellers). Record 514 may indicate an occurrence in which the seller fulfilled a promise/agreement (e.g., to sell goods, etc.). Records 516-522 may indicate occurrences in which the seller failed to fulfill promises/agreements.

In some embodiments, only particular records (and/or particular types of negotiation actions) associated with entities are utilized to calculate a trustworthiness score (and/or determine a trustworthiness score vector). For example, in FIG. 5, records 510-522 (i.e., seven of the records associated with Seller A) may be utilized, while records 504, 506, and 508 (i.e., three of the records associated with Seller A) are not. In such an instance, the trustworthiness score vector for the seller (e.g., Seller A) may be determined or expressed as $s^a=(1/7, 4/7, 2/7)$. That is, the "1/7" component of the vector may be associated with record 514, the "4/7" component may be associated with records 516-522, and the "2/7" component may be associated with records 510 and 512. Such a trustworthiness score (or trustworthiness score vector) may be calculated or determined for each of the entities involved and utilized by the other entities in a negotiation process.

Thus, it should be noted that in some embodiments a score (or vector) may be determined for each of the trustworthiness criteria utilized, which may then be combined to determine a trustworthiness score (or trustworthiness score vector) for the particular entity. For example, in embodiments in which the trustworthiness score is determined as a vector, each component of the vector may correspond to a (scalar) score or individual vector component (or element, dimension, magnitude, etc.) determined for (or associated with) a respective trustworthiness criterion.

For instance, continuing with the above example, utilizing the entities described above with respect to FIG. 4, at time (t+1), an offer (or counteroffer) submitted by seller 408 (or Seller B) may take into account the trustworthiness (or trustworthiness score) of each of the other entities (e.g., Seller A, Buyer Y, etc.). Such an offer may be expressed as $o_{b,t+1}=h_b(o_{b,t}, o_{a,t}, s^a, s^y, \ldots)$. As an example of a simple (updated) negotiation strategy, an entity may decide to not negotiate and/or deal with any entities that have trustworthiness scores below a predetermined threshold. However, more sophisticated strategies may be utilized, such as adjusting offers (or offer attributes, such as price) as a function of the trustworthiness score calculated for other entities.

Figure 6:
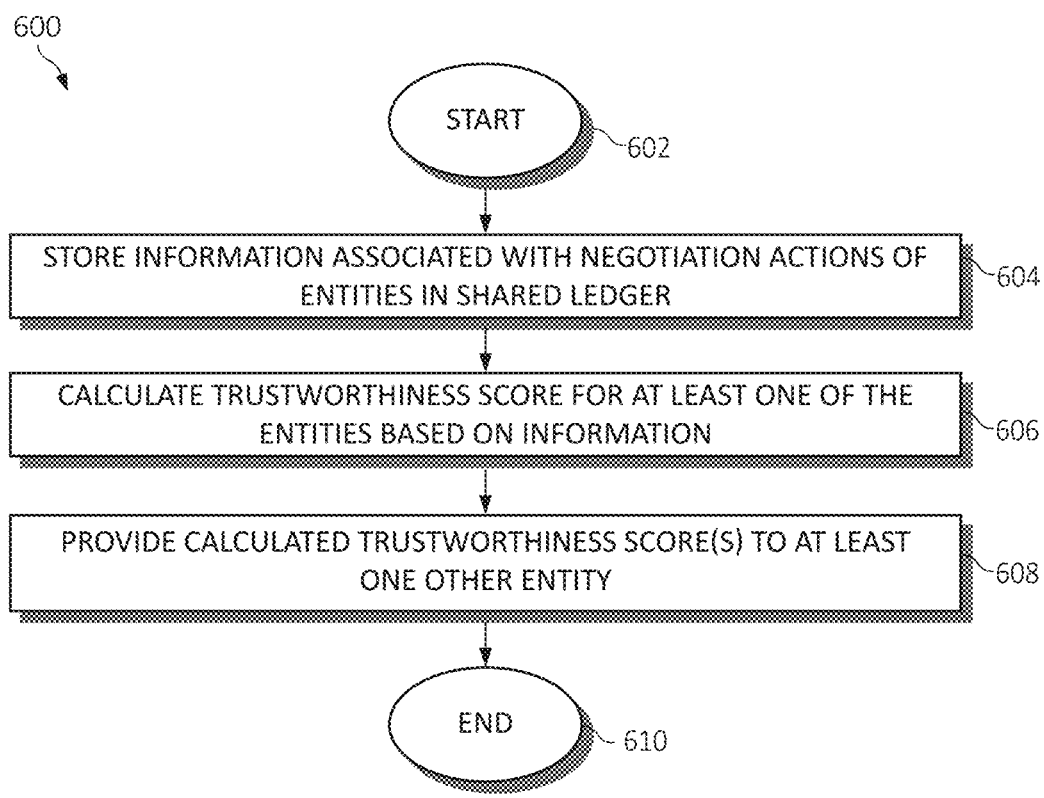
FIG. 6 is a flowchart diagram of an exemplary method for establishing trust in commerce negotiations according to an embodiment of the present invention.

Turning to FIG. 6, a flowchart diagram of an exemplary method 600 for establishing trust in commerce (e.g., e-commerce) negotiations is provided. The method 600 begins (step 602) with, for example, information associated with previous negotiation actions of entities (or parties) involved in a negotiation process being received and/or a negotiation process being initiated.

The information associated with the negotiation actions of each of a plurality of entities is stored in a shared ledger (and/or a shared ledger with such information stored thereon/therein is received and/or made accessible) (step 604). The information associated with the negotiation actions of each of the plurality of entities may include at least one of offers, acceptance of offers, and transaction performance and may be associated with previous negotiation actions of each of the plurality of entities (i.e., trustworthiness criteria). The shared ledger may include at least one of a blockchain and a distributed database system with a quorum-based consensus.

A trustworthiness score is calculated for at least one of the plurality of entities based on the information associated with the negotiation actions of the at least one of the plurality of entities (step 606). The calculating of the trustworthiness score for the at least one of the plurality of entities may include determining a trustworthiness score vector for the at least one of the plurality of entities and/or calculating a trustworthiness score for each of the plurality of entities. The determining of the trustworthiness score vector for the at least one of the plurality of entities may include determining a vector component for each of a plurality of trustworthiness criteria within the information associated with the negotiation actions of the at least one of the plurality of entities.

The calculated trustworthiness score (or trustworthiness score vector) is provided to at least one other of the plurality of entities (step 608). For example, a trustworthiness score calculated for a particular entity involved in the negotiation process may be provided to at least one other entity involved in the negotiation process (e.g., via the generating of a signal representative thereof, an electronic communication, such as an email, etc.).

Method 600 ends (step 610) with, for example, the calculated trustworthiness score(s) being caused to be utilized in a negotiation/offer decision strategy of the at least one other of the plurality of entities. Information associated with current negotiation actions of each of the plurality of entities (e.g., current offers, etc.) may also be received and utilized in strategy. In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:
1. A method for establishing trust in commerce negotiations, by a processor, comprising:
    storing information associated with negotiation actions of each of a plurality of entities in a shared ledger, wherein the stored information associated with the negotiation actions is inclusive of applicable offers and counteroffers of respective entities of the plurality of entities for a product or service;

initiating a new negotiation action between at least two of the plurality of entities through a mediator agent program receiving at least one offer in the new negotiation action, wherein the mediator agent program represents a buyer or a seller of the new negotiation action, and wherein initiating the new negotiation action includes:
  receiving the at least one offer as characterized by a set of attributes and respective values of the attributes, wherein the respective values are assimilated into a tuple of attribute values,
  requesting at least one additional offer, wherein a most optimum requested offer is expressed as a maximum offer for a utility function,
  receiving the at least one additional offer, and
  generating an indication of a challenge to one of the at least one offer and the at least one additional offer to receive at least one counteroffer as dictated by the maximum offer for the utility function, wherein the new negotiation action is continued until the maximum offer for the utility function is reached;
executing machine learning logic to generate a trustworthiness model, wherein the trustworthiness model is generated using input of at least the stored information and information associated with the new negotiation action;
calculating a trustworthiness score for at least one of the plurality of entities being the buyer or seller based on the information associated with the negotiation actions of the at least one of the plurality of entities and an output of the trustworthiness model; and
providing said calculated trustworthiness score to at least one other of the plurality of entities through the mediator agent.

2. The method of claim 1, wherein the shared ledger includes at least one of a blockchain and a distributed database system with a quorum-based consensus.

3. The method of claim 1, wherein the calculating of the trustworthiness score for the at least one of the plurality of entities includes determining a trustworthiness score vector for the at least one of the plurality of entities.

4. The method of claim 3, wherein the determining of the trustworthiness score vector for the at least one of the plurality of entities includes determining a vector component for each of a plurality of trustworthiness criteria within the information associated with the negotiation actions of the at least one of the plurality of entities.

5. The method of claim 1, further comprising causing said calculated trustworthiness score to be utilized in an offer decision strategy of the at least one other of the plurality of entities.

6. The method of claim 5, wherein the information associated with negotiation actions of each of a plurality of entities includes information associated with previous negotiation actions of each of the plurality of entities, and further comprising receiving information associated with current negotiation actions of each of the plurality of entities.

7. A system for establishing trust in commerce negotiations comprising:
  a processor executing instructions stored in a memory device, wherein the processor:
    stores information associated with negotiation actions of each of a plurality of entities in a shared ledger, wherein the stored information associated with the negotiation actions is inclusive of applicable offers and counteroffers of respective entities of the plurality of entities for a product or service;
    initiates a new negotiation action between at least two of the plurality of entities through a mediator agent program receiving at least one offer in the new negotiation action, wherein the mediator agent program represents a buyer or a seller of the new negotiation action, and wherein initiating the new negotiation action includes:
      receiving the at least one offer as characterized by a set of attributes and respective values of the attributes, wherein the respective values are assimilated into a tuple of attribute values,
      requesting at least one additional offer, wherein a most optimum requested offer is expressed as a maximum offer for a utility function,
      receiving the at least one additional offer, and
      generating an indication of a challenge to one of the at least one offer and the at least one additional offer to receive at least one counteroffer as dictated by the maximum offer for the utility function, wherein the new negotiation action is continued until the maximum offer for the utility function is reached;
    executes machine learning logic to generate a trustworthiness model, wherein
    the trustworthiness model is generated using input of at least the stored information and information associated with the new negotiation action;
      calculates a trustworthiness score for at least one of the plurality of entities being the buyer or seller based on the information associated with the negotiation actions of the at least one of the plurality of entities and an output of the trustworthiness model; and
      provides said calculated trustworthiness score to at least one other of the plurality of entities through the mediator agent.

8. The system of claim 7, wherein the shared ledger includes at least one of a blockchain and a distributed database system with a quorum-based consensus.

9. The system of claim 7, wherein the calculating of the trustworthiness score for the at least one of the plurality of entities includes determining a trustworthiness score vector for the at least one of the plurality of entities.

10. The system of claim 9, wherein the determining of the trustworthiness score vector for the at least one of the plurality of entities includes determining a vector component for each of a plurality of trustworthiness criteria within the information associated with the negotiation actions of the at least one of the plurality of entities.

11. The system of claim 7, wherein the processor further causes said calculated trustworthiness score to be utilized in an offer decision strategy of the at least one other of the plurality of entities.

12. The system of claim 11, wherein the information associated with negotiation actions of each of a plurality of entities includes information associated with previous negotiation actions of each of the plurality of entities, and wherein the processor further receives information associated with current negotiation actions of each of the plurality of entities.

13. A computer program product for establishing trust in commerce negotiations, by a processor, the computer program product embodied on a non-transitory computer-readable storage medium having computer-readable program code portions stored therein, the computer-readable program code portions comprising:
  an executable portion that stores information associated with negotiation actions of each of a plurality of entities in a shared ledger, wherein the stored information associated with the negotiation actions is inclusive of applicable offers and counteroffers of respective entities of the plurality of entities for a product or service;

an executable portion that initiates a new negotiation action between at least two of the plurality of entities through a mediator agent program receiving at least one offer in the new negotiation action, wherein the mediator agent program represents a buyer or a seller of the new negotiation action, and wherein initiating the new negotiation action includes:

receiving the at least one offer as characterized by a set of attributes and respective values of the attributes, wherein the respective values are assimilated into a tuple of attribute values, requesting at least one additional offer, wherein a most optimum requested offer is expressed as a maximum offer for a utility function, receiving the at least one additional offer, and generating an indication of a challenge to one of the at least one offer and the at least one additional offer to receive at least one counteroffer as dictated by the maximum offer for the utility function, wherein the new negotiation action is continued until the maximum offer for the utility function is reached;

an executable portion that executes machine learning logic to generate a trustworthiness model, wherein the trustworthiness model is generated using input of at least the stored information and information associated with the new negotiation action;

an executable portion that calculates a trustworthiness score for at least one of the plurality of entities being the buyer or seller based on the information associated with the negotiation actions of the at least one of the plurality of entities and an output of the trustworthiness model; and an executable portion that provides said calculated trustworthiness score to at least one other of the plurality of entities through the mediator agent.

14. The computer program product of claim 13, wherein the shared ledger includes at least one of a blockchain and a distributed database system with a quorum-based consensus.

15. The computer program product of claim 13, wherein the calculating of the trustworthiness score for the at least one of the plurality of entities includes determining a trustworthiness score vector for the at least one of the plurality of entities.

16. The computer program product of claim 15, wherein the determining of the trustworthiness score vector for the at least one of the plurality of entities includes determining a vector component for each of a plurality of trustworthiness criteria within the information associated with the negotiation actions of the at least one of the plurality of entities.

17. The computer program product of claim 13, wherein the computer-readable program code portions further include an executable portion that causes said calculated trustworthiness score to be utilized in an offer decision strategy of the at least one other of the plurality of entities.

18. The computer program product of claim 17, wherein the information associated with negotiation actions of each of a plurality of entities includes information associated with previous negotiation actions of each of the plurality of entities, and wherein the computer-readable program code portions further include an executable portion that receives information associated with current negotiation actions of each of the plurality of entities.

* * * * *